United States Patent
Gladd, Sr.

(10) Patent No.: US 6,263,693 B1
(45) Date of Patent: *Jul. 24, 2001

(54) ALTERNATING HORIZONTAL AIR FLOW CHILLER

(75) Inventor: Andrew J. Gladd, Sr., 537 Grace, Northville, MI (US) 48167

(73) Assignee: Andrew J. Gladd, Sr., Northville, MI (US)

(*) Notice: Subject to any disclaimer, the term of this patent is extended or adjusted under 35 U.S.C. 154(b) by 0 days.

This patent is subject to a terminal disclaimer.

(21) Appl. No.: 09/359,463

(22) Filed: Jul. 22, 1999

Related U.S. Application Data

(62) Division of application No. 08/717,554, filed on Sep. 23, 1996, now Pat. No. 5,937,845.

(51) Int. Cl.[7] .............................. F25D 17/04; F26B 19/00
(52) U.S. Cl. ................................. 62/418; 34/225; 34/489
(58) Field of Search .............................. 34/489, 488, 225, 34/233; 62/62, 418

(56) References Cited

U.S. PATENT DOCUMENTS

| | | | |
|---|---|---|---|
| 3,641,945 | * 2/1972 | Tillander et al. | 34/225 |
| 4,162,141 | 7/1979 | West | 432/144 |
| 4,319,460 | 3/1982 | Williams | 62/78 |
| 4,363,263 | 12/1982 | Williams | 99/352 |
| 4,556,043 | 12/1985 | Bratton | 126/21 A |
| 4,722,683 | 2/1988 | Royer | 432/152 |
| 4,736,592 | * 4/1988 | Ohling | 62/62 |
| 4,927,358 | 5/1990 | Tamura et al. | 432/204 |
| 5,226,244 | * 7/1993 | Carter et al. | 34/489 X |
| 5,522,159 | * 6/1996 | Lundberg | 34/488 X |
| 5,937,845 | * 7/1999 | Galdd, Sr. | 126/21 A |

* cited by examiner

Primary Examiner—William Wayner
(74) Attorney, Agent, or Firm—Harness, Dickey & Pierce, P.L.C.

(57) ABSTRACT

An air flow chamber for cooking or chilling using alternating horizontal air flow has an air heating or cooling apparatus and an air recirculating flow control mechanism for forcing heated or cooled air through an enclosure wherein said air is alternatingly directed horizontally through said enclosure in a first cycle in one horizontal direction and in a second cycle in the opposite direction.

9 Claims, 3 Drawing Sheets

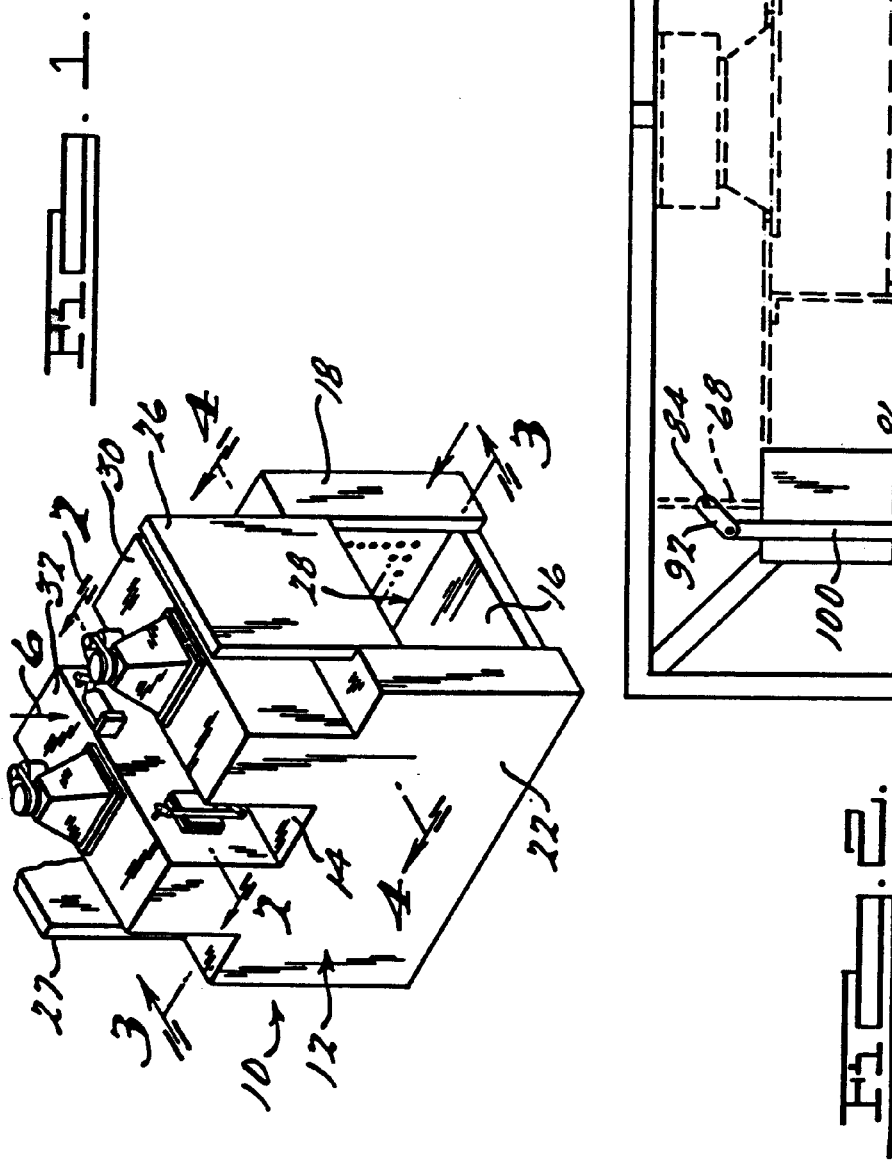

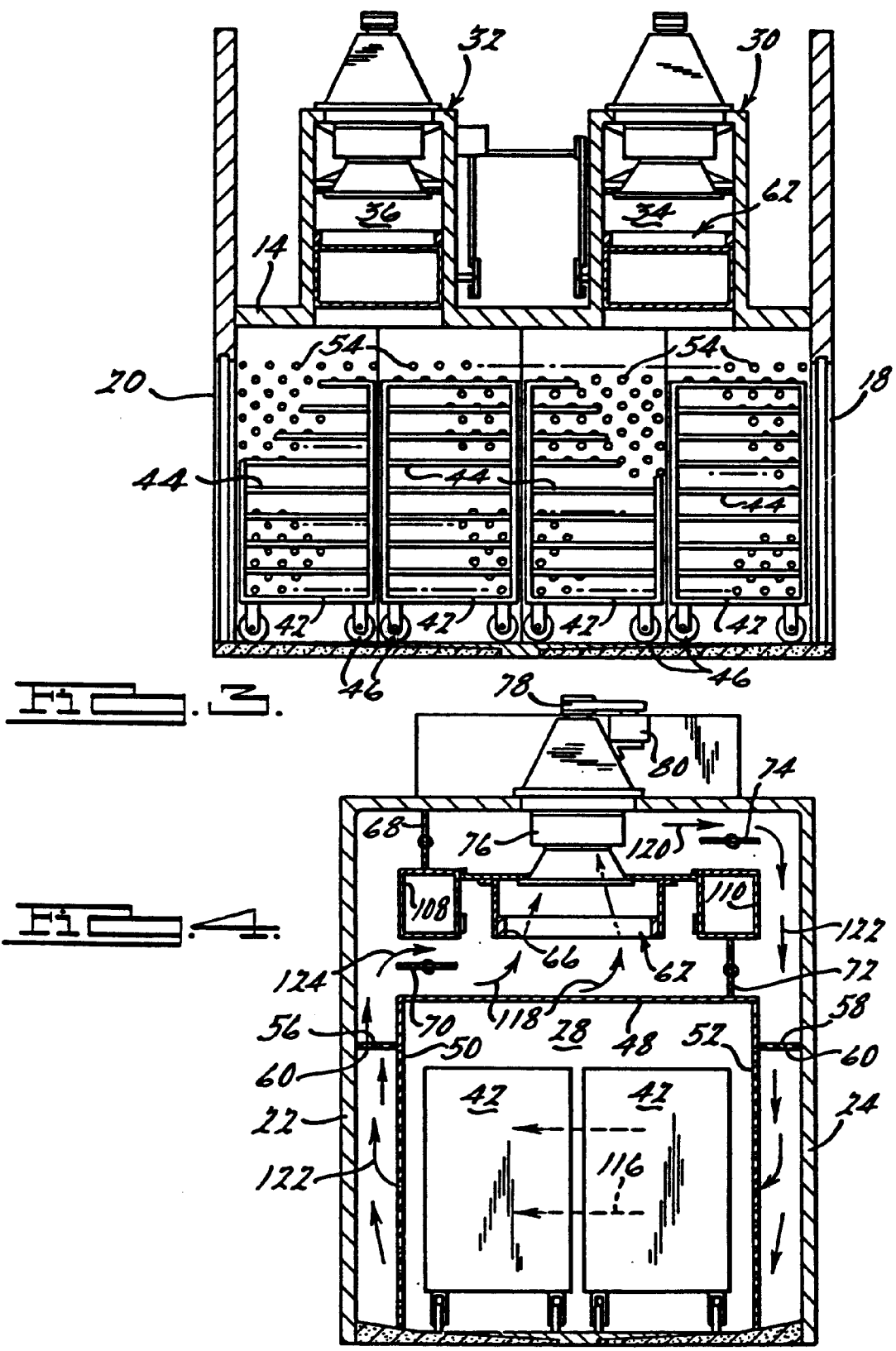

ALTERNATING HORIZONTAL AIR FLOW CHILLER

This is a division of U.S. patent application No. 08/717,554, filed Sep. 23, 1996, U.S. Pat. No. 5,937,845.

BACKGROUND AND SUMMARY OF THE INVENTION

The present invention relates to an air flow chamber for cooking or chilling using alternating horizontal air flow. More particularly, the present invention especially relates to an oven having an improved air flow system using alternating horizontal air flow.

Ovens have been in common use for many years to cook or heat food products with a plurality of heat ducts directing the flow of heated air against the food product. Food products, of course, are generally preferably heated uniformly within the cooking chamber. However, uniform heating remains a problems. Thus, there is a need for an improved oven having a cooking chamber with improved air flow for more even application of heat to food products in the cooking chamber.

Examples of U.S. patents directed to apparatus having more uniform heating include U.S. Pat. No. 4,162,141, issued Jul. 24, 1979 to West for "Variable Air Flow Oven;" and U.S. Pat. No. 4,556,043, issued Dec. 3, 1985 to Bratton for "Air Delivery System For An Impingement Food Preparation Oven Including A Conceal Air Deflector."

There remains a need, however, for further improvements in ovens with respect to uniform application of heated air to food products therein. Accordingly, the present invention provides a cooking oven having a cooking chamber for containing food products to be heated, a plenum in which air is heated and an air delivery system providing alternating horizontal air flow through the cooking chamber. Further understanding of the present invention will be had from the following disclosure and claims, taken in conjunction with the accompanying drawings.

BRIEF DESCRIPTION OF THE DRAWINGS

FIG. 1 is a perspective view showing a preferred embodiment of an alternating horizontal air flow oven of the present invention with the door thereof illustrated in an open position.

FIG. 2 is a sectional view of the oven of FIG. 1 taken along line 2—2 in FIG. 1.

FIG. 3 is a sectional view of the oven of FIG. 1 taken along line 3—3 in FIG. 1.

FIG. 4 is a sectional view of the oven of FIG. 1 taken along line 4—4 in FIG. 1 and illustrating horizontal air flow in a first direction.

DETAILED DESCRIPTION OF THE PREFERRED EMBODIMENTS

Figure 6:
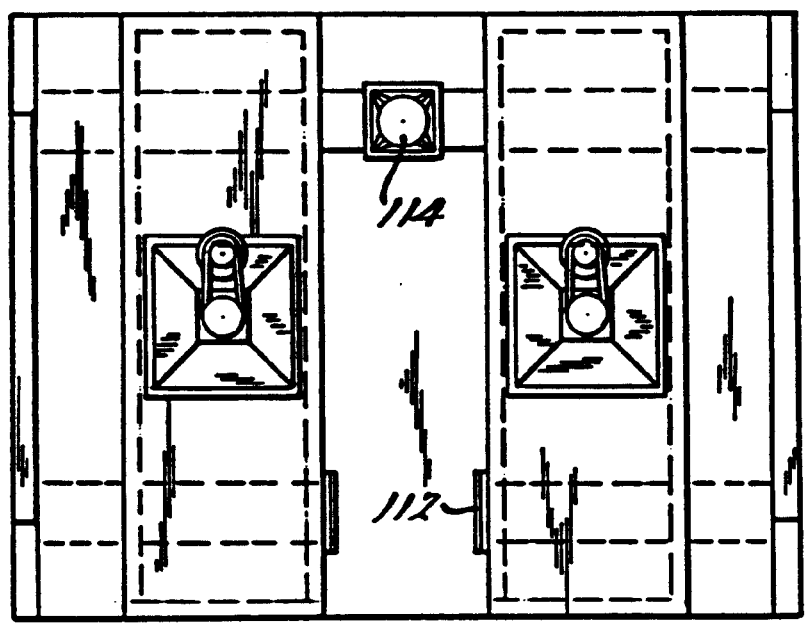
FIG. 6 is a plan view of the oven of FIG. 1.

Now referring to the figures, a preferred embodiment of an alternating horizontal air flow oven of the present invention is shown and indicated generally by the numeral 10. It will be appreciated that, while the preferred embodiment of the present invention is shown and described herein as an oven, the broad concept of the present invention includes chillers as well as ovens. Oven 10 comprises an enclosure 12 having top and bottom walls 14 and 16, respectively; front and rear walls 18 and 20, respectively; and side walls 22 and 24, respectively. Vertically sliding doors 26 and 27 are provided for access to the interior 28 of enclosure 12. Positioned on and projecting above top 14 are a pair of housings 30 and 32 which enclose air plenums 34 and 36. As is described in greater detail below, means for heating and alternating the direction of air flow are provided in plenums 34 and 36 and interior 28 of enclosure 12 to obtain the advantageous heating or cooking of comestibles or other materials within the alternating horizontal air flow of the oven 10 of the present invention.

Figure 5:
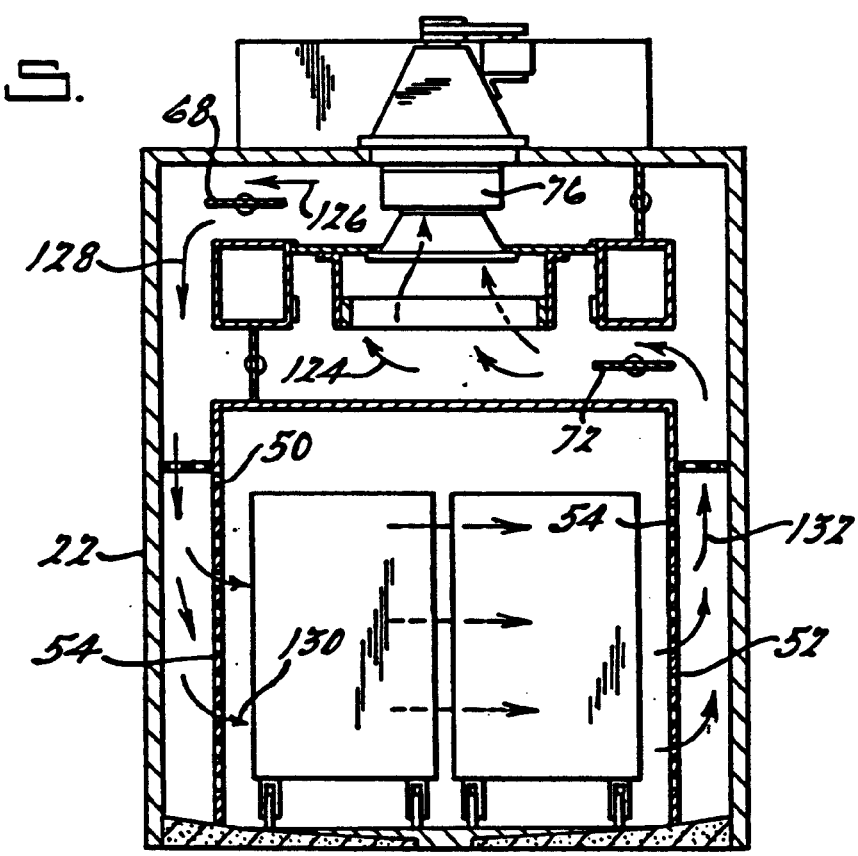
FIG. 5 is a sectional view analogous to FIG. 4 but showing horizontal air flow in a second direction.

As is best shown in FIGS. 4 to 6, the interior 28 of enclosure 12 is adapted to contain one or more trucks 42 which are movable through door 26 and 27 and which are adapted to support meat or other comestibles to be heated or cooked within oven 10. Thus, each truck 42 can have a plurality of shelves 44 and wheels 46 to facilitate transport of trucks 42 into and out of the interior 28 of oven 10.

Interior top wall 48 and interior side walls 50 and 52 are spaced from adjacent top 14 and side walls 22 and 24 to provide air flow as set forth in more detail hereinafter. Interior side walls 50 and 52 have a plurality of apertures 54 therein to allow air flow therethrough. Spacers 56 and 58 support side walls 50 and 52, respectively, and also have a plurality of apertures 60 therein to allow airflow therethrough.

The preferred embodiment of an alternating horizontal air flow oven 10 has a pair of air plenums 34 and 36 which are analogous in construction. Thus, the following description of plenum 34 is also applicable to plenum 36.

Plenum 34 includes an air heating apparatus comprising a heating means 62 for heating air which is then directed by flow control means 64 through appropriate duct work into enclosure 12 to heat the contents therein Heating means 62 includes a steam coil 66. Steam coil 66 preferably includes steam atomizing nozzles (not shown in the figure) as is conventional in the art. Thus, steam coil 66 can provide dry steam or wet steam as desired. Optionally, other means can be provided to apply heat, for example, a gas burner or electric coils could be substituted for the steam coils of the preferred embodiment shown in the figures. Furthermore, and as will be appreciated by those skilled in the art, where the present invention is a chiller, the air heating means 62 will be replaced by a suitable air cooling apparatus, such as air cooling means. Thus, refrigeration coils could be substituted for steam coil 66.

Air flow control means 64 includes dampers 68, 70, 72 and 74 and recirculating fan 76 driven by belt 78 connected to motor 80. Dampers 68, 70, 72 and 74 are connected by a suitable linkage mechanism 82 which selectively opens and closes the dampers as described in further detail below. Thus, dampers 68, 70, 72 and 74 are pivotally connected at 84, 86, 88 and 90, respectively, to respective pivot arms 92, 94, 96 and 98. The respective pivot arms are connected by rods 100, 102 and 104. Thus, actuation of control cylinder 106 selectively changes respective dampers between open and closed positions.

Plenum 34 also includes exhaust duct 108 and fresh air make up duct 110. Temperature control dampers 112 and 114 adjust the amount of fresh air make up and exhaust air to control a temperature within oven 10 in a conventional manner.

In operation, alternating horizontal air flow oven 10 of the present invention operates in accordance with the following. Oven 10 operates cyclically to alternate air flow horizontally through enclosure 12. Each cycle may continue for a time ranging from a few seconds to several minutes, depending upon the desired effect. Generally, suitable cycle times are from about one minute to about thirty minutes. However, the exact time of the cycle is dependent upon the temperature of the heating air and the comestible or other material to be heated.

Now referring to FIG. 4, the air flow of a first cycle through interior 28 is illustrated therein by arrows 116. Thus fan 76 operates to draw air upwardly as shown by arrow 118 and rightwardly as viewed in FIG. 4 as indicted by arrow 120 through damper 74 which is in an open position. The heated air then flows downwardly as shown by arrow 122 along side 24 of enclosure 12 and then horizontally leftwardly as viewed in FIG. 4 through apertures 54 in interior side wall 52. The heated air then proceeds through trucks 42 as indicated by arrows 116 and then through apertures 50 in side wall 52 and upwardly as indicated by arrows 122 and then rightwardly through open damper 70 as indicated by arrow 124 and again upwardly through fan 76 as indicated by arrows 118. Dampers 68 and 72 are in a closed position while dampers 70 and 74 are in an open position, thus directing the air as indicated.

In cycle 2, dampers 68, 70, 72 and 74 are moved from their respective open and closed positions to respective closed and open positions to redirect the air as shown in FIG. 5. Thus, and now referring to FIG. 5, air is again drawn upwardly through fan 76 as shown by arrows 124 and leftwardly as shown by arrow 126 through open damper 68 and downwardly as indicated by arrow 128 along the side wall 52 to flow then horizontally as indicated by arrows 130 through apertures 54 in interior side wall 52 through trucks 42 and then through apertures 54 in side wall 52 upwardly as indicated by arrows 132 and then through damper 72 and again upwardly into fan 76.

Thus, in accordance with the present invention, alternating heated air flow is provided through a heating chamber to cook or heat comestibles or other materials therein. Of course, it will be appreciated by those skilled in the art that the present invention is subject to modification and variation within the broad scope of the invention. Such modifications and variations are intended to be included herein as the present invention is intended to be limited only by the scope of the appended claims.

What is claimed is:

1. An alternating horizontal air flow chiller having an air cooling apparatus in fluid communication with an enclosure having opposite side walls and having an air recirculating flow control mechanism for forcing cooled air through said enclosure wherein said air is alternatingly directed horizontally through said enclosure in a first cycle in one horizontal direction and in a second cycle in the opposite direction, said air recirculating flow control mechanism directing said air horizontally through said enclosure by applying air through one side wall while withdrawing air from an opposite side wall in said first cycle and then withdrawing air from said one side wall while supplying air through said opposite side wall in said second cycle.

2. An alternating horizontal air flow chiller having an air cooling apparatus in fluid communication with an enclosure having opposite side walls and having an air recirculating flow control mechanism for forcing cooled air through said enclosure wherein said air is alternatingly directed horizontally through said enclosure in a first cycle in one horizontal direction and in a second cycle in the opposite direction, said air cooling apparatus including an air exhaust duct and a fresh air duct for controlling air temperature in said enclosure and said air recirculating flow control mechanism directing said air horizontally through said enclosure by supplying air through one side wall while withdrawing air from an opposite side wall in said first cycle and then withdrawing air from said one side wall while supplying air through said opposite side wall in said second cycle.

3. The air flow chiller of claim 2 wherein the flow control apparatus includes a plurality of ducts with a plurality of dampers positioned therein, said ducts being in fluid communication with said enclosure and said dampers being interconnected to alternate between closed and open positions.

4. The air flow chiller of claim 3 wherein said chiller includes an air exhaust damper and an air inlet damper for temperature control, said air cooling apparatus being in fluid communication with said air exhaust and air inlet means for controlling air temperature inside said enclosure by mixing a selected quantity of outside air with cooled air of said cooling apparatus.

5. The air flow chiller of claim 2 wherein said chiller has a plurality of plenums, each plenum housing an air cooling apparatus and an air recirculating flow control mechanism.

6. The air flow chiller of claim 5 wherein said enclosure includes an impervious outer wall and an air previous inner wall having a plurality of apertures therein thereby providing a vertical duct for air flow therebetween.

7. The air flow chiller of claim 6 including at least one truck sized to fit therein.

8. The air flow chiller of claim 7 wherein said apertures extend the height of said truck.

9. An alternating horizontal air flow chiller having an enclosure for air cooling a product and a plenum housing an air cooler and an air flow control mechanism, said air cooler being in fluid communication with outside air for control of air temperature in said enclosure and said enclosure having a pair of opposite side walls with a multiplicity of apertures therein, said side walls spaced from adjacent outer side walls generally parallel thereto to thereby provide a vertical air flow passageway therebetween, each said passageway being in fluid communication with duct work having control dampers therein for selectively alternating air flow therethrough by supplying air to said enclosure through one of said side walls while withdrawing air from said enclosure through an opposite side wall and then withdrawing air from said enclosure through said one of said side walls while supplying air to said enclosure through said opposite side wall.

* * * * *